(12) United States Patent
Winsloe

(10) Patent No.: US 7,554,216 B2
(45) Date of Patent: Jun. 30, 2009

(54) MODULAR NEAR-SHORE WAVE-POWERED ENERGY COLLECTION SYSTEM

(75) Inventor: Ronald Murloe Winsloe, Riverton (NZ)

(73) Assignee: Wave Power South Limited (NZ)

( * ) Notice: Subject to any disclaimer, the term of this patent is extended or adjusted under 35 U.S.C. 154(b) by 348 days.

(21) Appl. No.: 11/658,722

(22) PCT Filed: Jul. 27, 2005

(86) PCT No.: PCT/NZ2005/000190

§ 371 (c)(1),
(2), (4) Date: Jan. 29, 2007

(87) PCT Pub. No.: WO2006/011817

PCT Pub. Date: Feb. 2, 2006

(65) Prior Publication Data

US 2009/0001729 A1 Jan. 1, 2009

(30) Foreign Application Priority Data

Jul. 29, 2004 (NZ) .................................. 534415

(51) Int. Cl.
*F03B 13/10* (2006.01)
*F04B 23/08* (2006.01)

(52) U.S. Cl. .................. 290/53; 290/42; 417/331

(58) Field of Classification Search .............. 290/42, 290/43, 44, 53, 54, 55; 417/331, 333
See application file for complete search history.

(56) References Cited

U.S. PATENT DOCUMENTS

| 4,326,840 A | * | 4/1982 | Hicks et al. ................ 417/331 |
| 4,441,872 A | * | 4/1984 | Seale ......................... 417/282 |
| 4,603,551 A | * | 8/1986 | Wood ......................... 60/496 |
| 4,883,411 A | * | 11/1989 | Windle ....................... 417/331 |
| 5,186,822 A | * | 2/1993 | Tzong et al. ................ 210/122 |
| 5,842,838 A | * | 12/1998 | Berg .......................... 417/331 |
| 7,298,054 B2 | * | 11/2007 | Hirsch ........................ 290/42 |

FOREIGN PATENT DOCUMENTS

| CA | 2286545 | 11/2000 |
| GB | 2069061 | 8/1981 |
| SU | 1097819 | 6/1984 |

* cited by examiner

*Primary Examiner*—Nicholas Ponomarenko
(74) *Attorney, Agent, or Firm*—McCormick, Paulding & Huber LLP

(57) ABSTRACT

A modular near-shore wave-powered energy collection system, which includes a plurality of connected modules, each module including at least one flotation device and at least one OWC, wherein each OWC is connected to a common pressure manifold and a common vacuum manifold and the common pressure manifold and the common vacuum manifold are connectable to a device.

16 Claims, 5 Drawing Sheets

MODULAR NEAR-SHORE WAVE-POWERED ENERGY COLLECTION SYSTEM

TECHNICAL FIELD

The invention relates to the harnessing of wave energy for power generation and other applications.

BACKGROUND

The search for sustainable energy sources has prompted many studies into wave generation. One device commonly used in wave generation systems is an Oscillating Water Column (OWC). This is a hollow vessel, with one open end. When partially submerged in waves, with the open end in the water, the OWC contains a column of water and a region of air trapped at the top. The water level within the OWC alternately rises and falls with the waves. This acts as a piston and creates a corresponding pattern of alternating positive and negative pressure at the top of the OWC.

This comprises a partly submerged structure which is open to the sea below the water surface so that it contains a column of water. Air is trapped above the surface of the water column. As waves enter and exit the collector, the water column moves up and down and acts like a piston on the air, pushing it back and forth.

GB 2 069 061 is an example of an existing system in which air flows from an OWC through a valve into a resilient chamber having elastic characteristics, through another valve into a turbine, then into an exhaust chamber, through a third valve and back into the OWC. This invention requires that the resilient chamber be surrounded by the exhaust chamber.

In CA 2 286 545, when there is positive pressure in the OWC, air passes through a valve into an annular chamber and over turbines 54. The air is then discharged to the atmosphere through an exit port. When the water level falls, the air flow is reversed and air is drawn from the atmosphere over the turbines and back into the OWC. This system therefore requires the use of specialised dual-directional turbines in order to extract energy.

In SU 1097819 the motion of the waves drives a hydraulic pump to force water into a pneumohydraulic accumulator. It is the water which does the work in this system, rather than the air from an OWC.

Many wave generation systems are designed to operate on deep-sea ocean waves because of the massive amounts of energy available at a given point. This creates two major problems. The first is that the amount of energy is unpredictable and can vary from negligible amounts to storm related destructive forces. The second is that often the large distance from shore requires costly cabling systems and suffers from the inevitable losses involved in transmission.

Near-shore waves, although smaller, are much more reliable and consistent than ocean swells. A near-shore energy collection system reduces energy loss, eliminates the need for expensive cabling and improves accessibility for maintenance or construction.

However, near-shore conditions and topology vary greatly along different coastlines, requiring custom made systems to fit local requirements.

DISCLOSURE OF INVENTION

It is an object of the present invention to provide a modular near-shore wave-powered energy collection system which is efficient, easy to install and maintain, and flexible enough to suit multiple situations.

The invention consists of a modular near-shore wave-powered energy collection system, which includes a plurality of connected modules, each module including:
  at least one flotation device; and
  at least one OWC;
wherein:
  each OWC is connected to a common pressure manifold and a common vacuum manifold; and
  the common pressure manifold and the common vacuum manifold are connectable to a device.

Preferably the air flow through the device is substantially uni-directional.

Preferably the device is a generator, water pump or other device and more preferably the device is located on-shore. More than one device may be used in the same system. The system may be anchored on-shore, at sea or both.

Preferably the flotation devices are continuously monitored and adjusted to maintain a desired setting. The flotation devices are of known type, such as permanent flotation materials and/or compressed air.

Preferably the system also includes maintenance infrastructure selected from the list comprising decking, handrails and service rails.

In a preferred embodiment the OWCs are made of a material selected from the list comprising metal, impact-resistant plastics materials, fibreglass or ferro-cement, the modules are rigidly joined together and the manifolds each include at least one flexible section.

BRIEF DESCRIPTION OF DRAWINGS

By way of example only, a preferred embodiment of the present invention is described in detail with reference to the accompanying drawings, in which:—

BEST MODE FOR CARRYING OUT THE INVENTION

Figure 1:
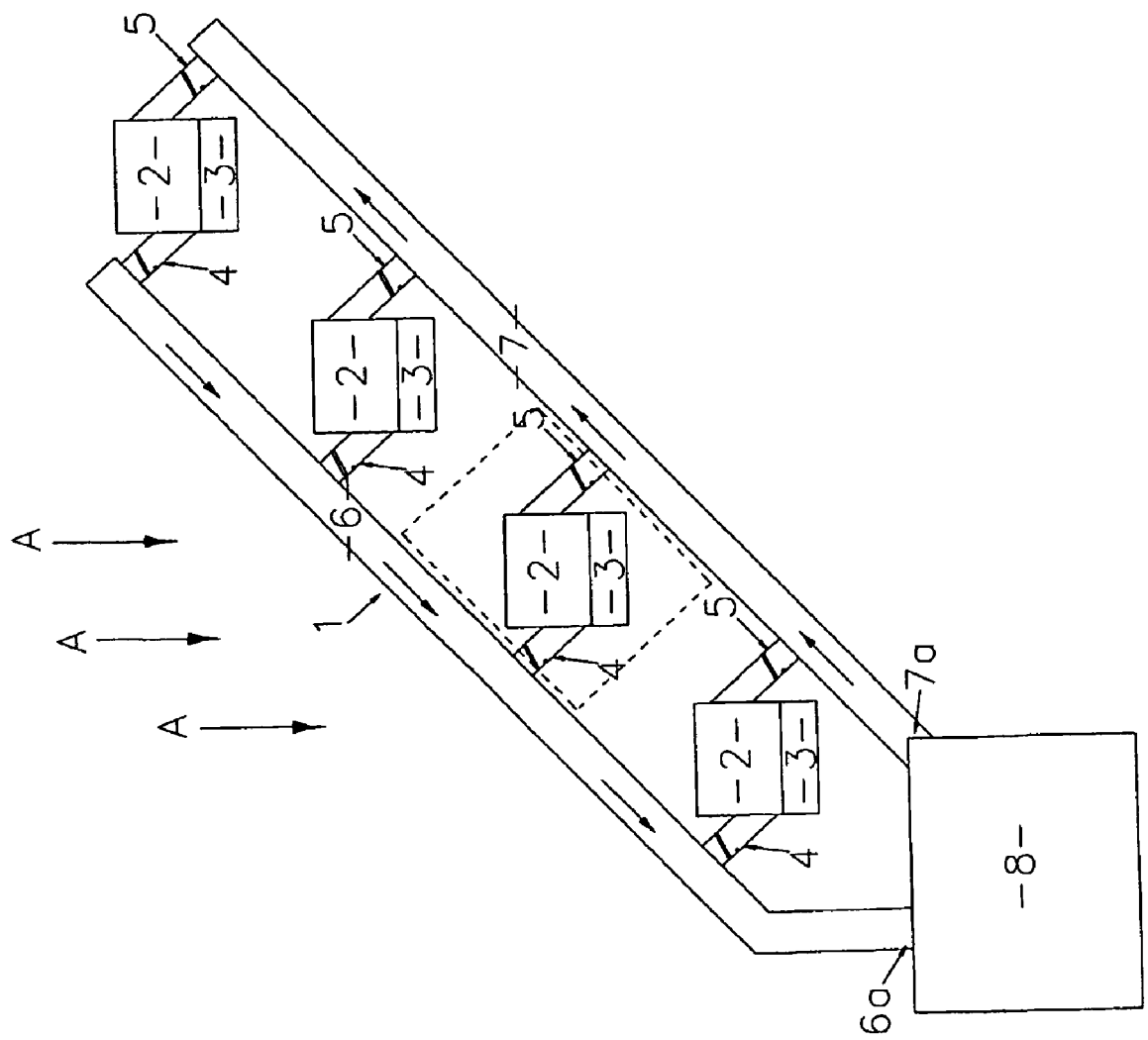
FIG. 1 is a plan view of a diagrammatic layout of a modular near-shore wave-powered energy collection system.
Figure 2:
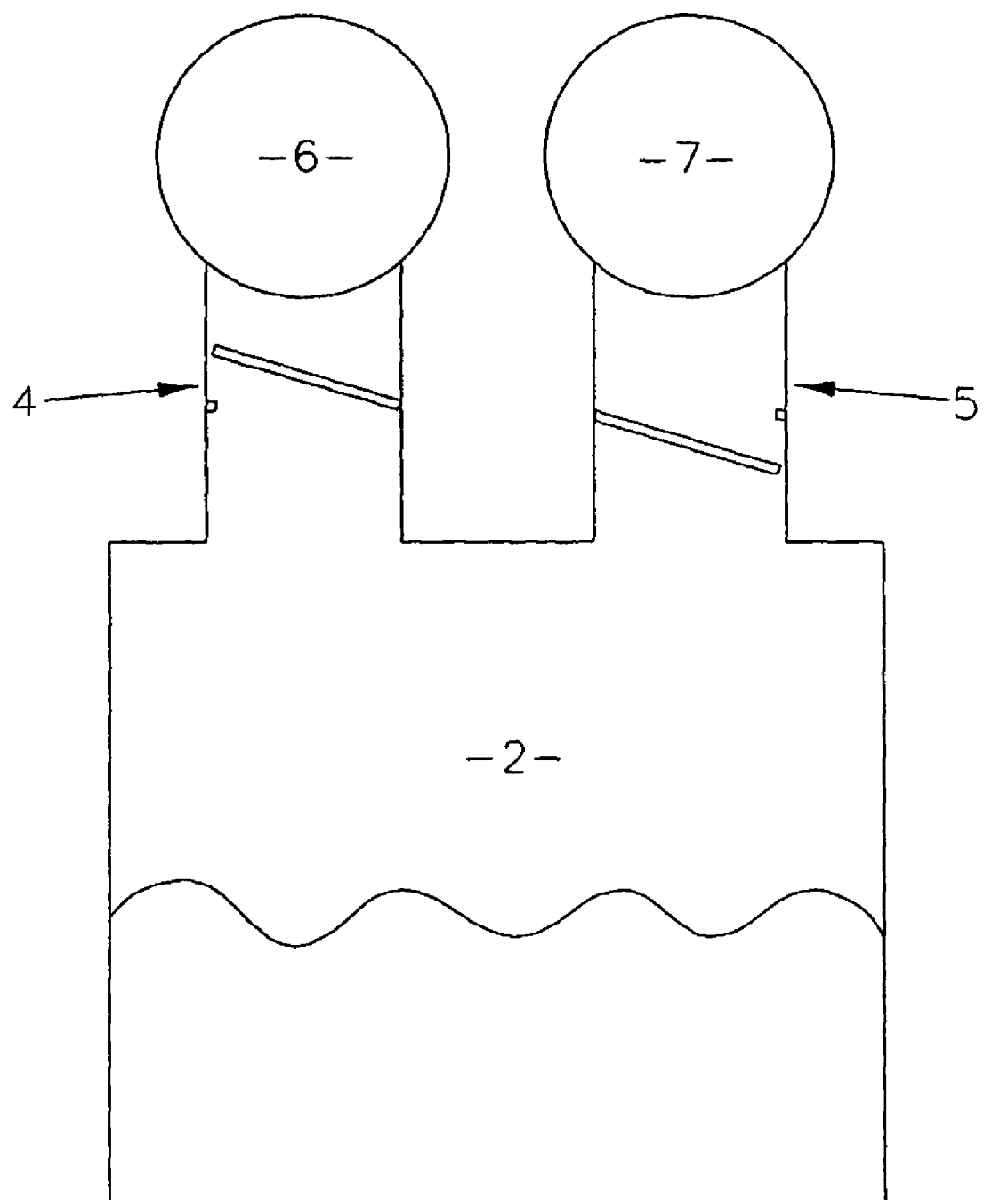
FIG. 2 is a diagrammatic cross-section through part of the system.
Figure 3:
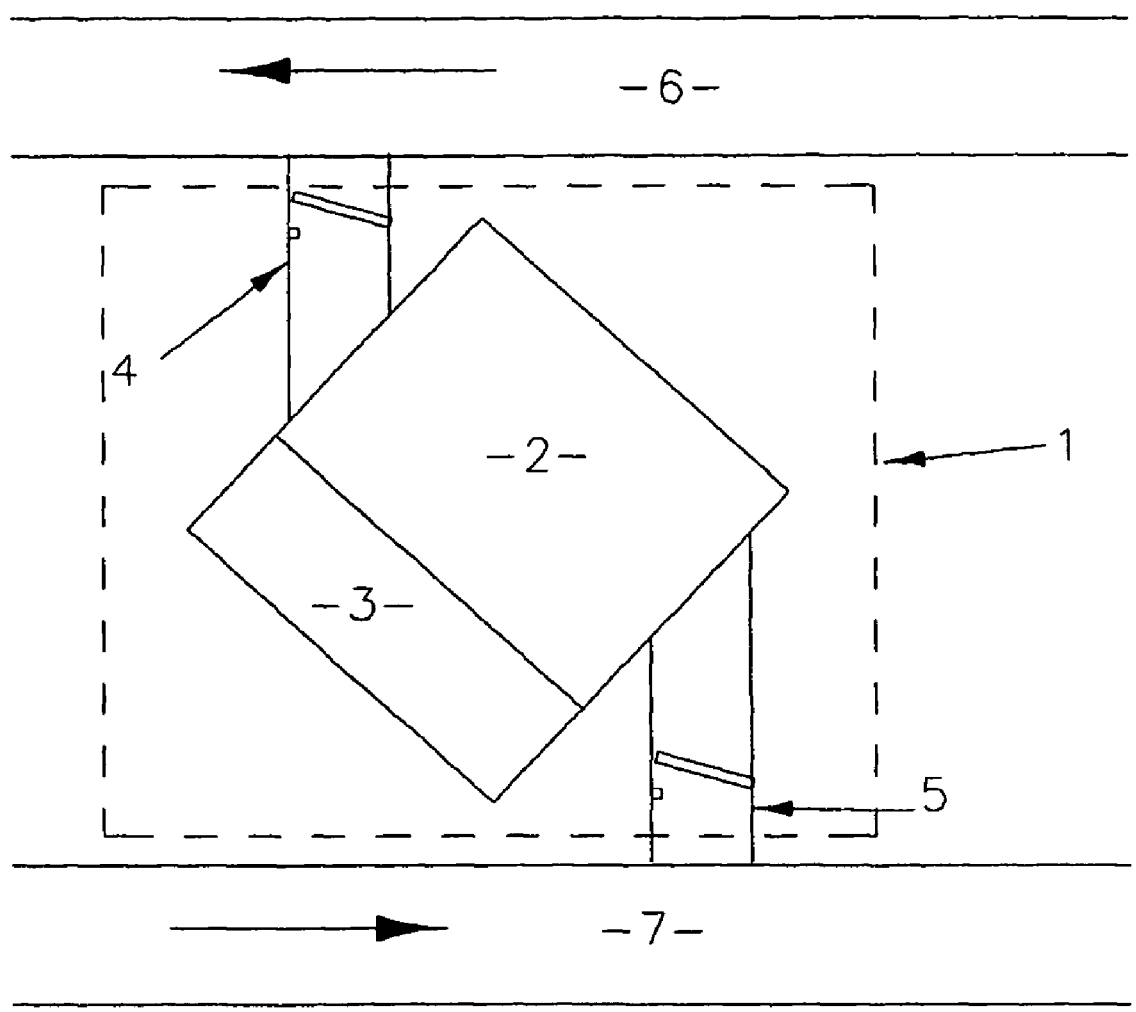
FIG. 3 shows part of FIG. 1 on a larger scale.

In a preferred embodiment each module of the modular near-shore wave-powered energy collection system consists of one OWC 2 and a flotation device 3. The OWC 2 is constructed of metal and has an oblong cross-section, with an open lower end. The OWC 2 is connected via valves 4 and 5 to common pressure manifold 6 and common vacuum manifold 7 respectively. Optionally drain tubes (not shown) may be provided above valve 4 to allow water to drain away.

As the water level rises and falls, pressure and suction are alternately created at the top of the OWC 2. When positive pressure is created, the valve 4 to common pressure manifold 6 opens, releasing the air into common pressure manifold 6. Conversely, when suction is created, the valve 4 to common pressure manifold 6 closes, and the valve 5 to common vacuum manifold 7 opens.

Multiple modules 1 are rigidly connected together so that a plurality of OWCs 2 are connected to common pressure manifold 6 and are also connected to common vacuum manifold 7. The end of common pressure manifold 6a and the end of common vacuum manifold 7a open on to opposite sides of the turbine of an on-shore generator 8. Air flows from the OWCs 2 into common pressure manifold 6. This air flow combines to flow through the turbine of on-shore generator 8 and is drawn into common vacuum manifold 7, creating a uni-directional flow of air through the turbine. The turbine is moved by this air flow, and the motion of the turbine can be used by on-shore generator 8 to create electricity by conventional means. The air flows back to OWCs 2 via common vacuum manifold 7.

The common pressure manifold 6 and common vacuum manifold 7 each include flexible sections 9 to reduce stress on the system as the tide rises and falls. The system also includes decking and handrails (not shown) to provide structural support for the system as a whole and to allow access from the shore for maintenance of the modules 1 in the system.

In this embodiment, the system is anchored on-shore by conventional anchoring means 10, utilising a standard flexible coupling. The system is oriented at an angle to the line of the waves (Arrows A) so that a different part of each wave encounters each module 1.

Figure 4:
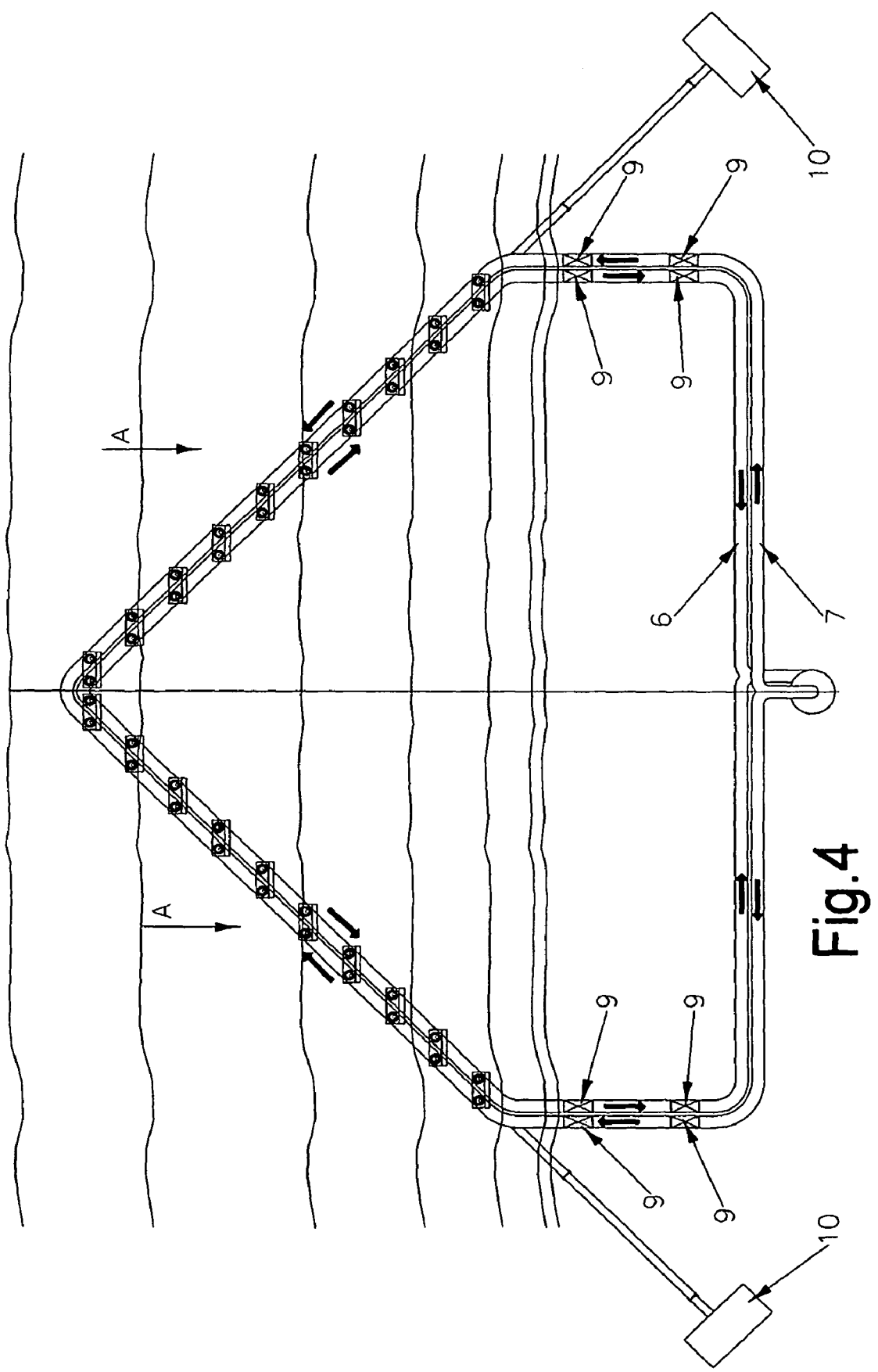
FIG. 4 is a plan view of one possible arrangement of the system.
Figure 5:
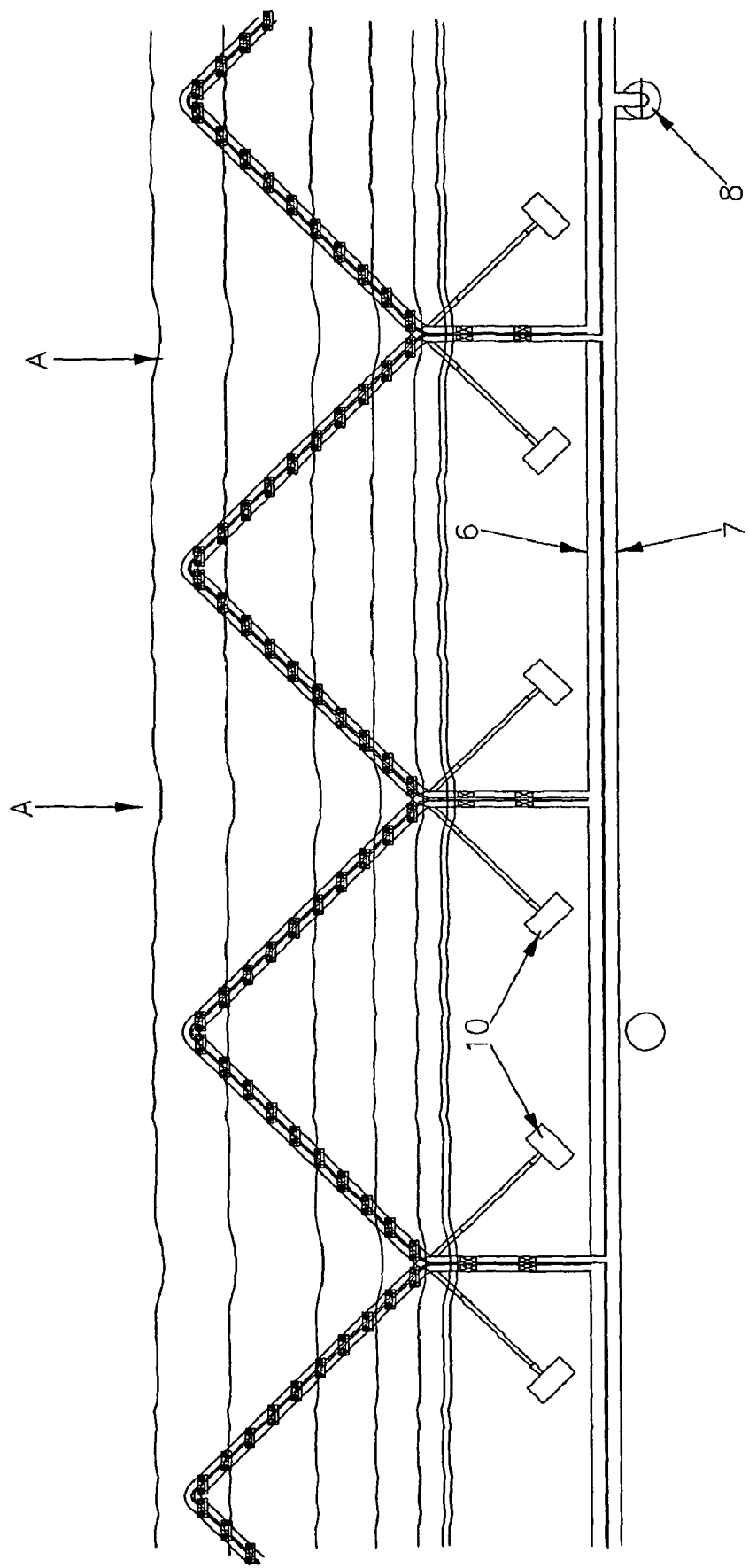
FIG. 5 is a plan view of an alternative arrangement of the system.

In one possible arrangement, shown in FIG. 4, the modules 1 are arranged to create two symmetrical systems across the incoming wave front. Another possibility, shown in FIG. 5, would be to arrange a series of systems in a 'saw-tooth' configuration, so that each system is at an angle to the incoming waves. The combination of many modules 1 in such a configuration may capture sufficient energy to power several devices, which may optionally be included.

What is claimed is:

1. A modular near-shore wave-powered energy collection system, which includes a plurality of connected modules, each module including:
   at least one flotation device; and
   at least one OWC;
   wherein:
   each OWC is connected to a common pressure manifold and a common vacuum manifold; and
   the common pressure manifold and the common vacuum manifold are connectable to a device.

2. A modular near-shore wave-powered energy collection system according to claim 1 wherein the air flow through the device is substantially uni-directional.

3. A modular near-shore wave-powered energy collection system according to either of claims 1 or 2 wherein the device is a generator or water pump.

4. A modular near-shore wave-powered energy collection system according to claim 1 wherein at least one flotation device is continuously monitored and adjusted to maintain a desired setting.

5. A modular near-shore wave-powered energy collection system according to claims 1 wherein each flotation device is selected from the list comprising permanent flotation materials and compressed air.

6. A modular near-shore wave-powered energy collection system according to claim 1 wherein the system also includes maintenance infrastructure selected from the list comprising decking, handrails and service rails.

7. A modular near-shore wave-powered energy collection system according to claim 1 wherein the device is located on-shore.

8. A modular near-shore wave-powered energy collection system according to claim 1 wherein the system is anchored entirely on-shore.

9. A modular near-shore wave-powered energy collection system according to claim 1 wherein the system is anchored entirely at sea.

10. A modular near-shore wave-powered energy collection system according to claim 1 wherein the system is anchored both on-shore and at sea.

11. A modular near-shore wave-powered energy collection system according to claim 1 wherein the OWCs are made of a material selected from the list comprising metal, impact-resistant plastics materials, fibreglass or ferro-cement.

12. A modular near-shore wave-powered energy collection system according to claim 1 wherein the modules are rigidly joined together.

13. A modular near-shore wave-powered energy collection system according to claim 1 wherein the manifolds include at least one flexible section.

14. A modular near-shore wave-powered energy collection system according to claim 1 wherein the common pressure manifold and the common vacuum manifold are connected to more than one device.

15. A modular near-shore wave-powered energy collection system, which includes a plurality of connected modules, each module including one flotation device and one OWC, wherein each OWC is connected to a common pressure manifold and a common vacuum manifold, the common pressure manifold and the common vacuum manifold being connected to an on-shore device, and wherein the modules are oriented at an angle to the line of the waves.

16. A modular near-shore wave-powered energy collection system including plurality of systems according to claim 15 arranged in a saw-tooth configuration.

* * * * *